United States Patent
Govil et al.

(10) Patent No.: US 8,453,108 B1
(45) Date of Patent: May 28, 2013

(54) STATIC, CONFIGURABLE KERNEL INTERFACE

(75) Inventors: Kinshuk Govil, Los Altos, CA (US); Gregory Hutchins, Palo Alto, CA (US); Patrick Tullmann, Millbrae, CA (US); Gagandeep S. Arneja, San Francisco, CA (US); Swathi Muralidharan Koundinya, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1869 days.

(21) Appl. No.: 11/707,484

(22) Filed: Feb. 15, 2007

(51) Int. Cl.
*G06F 9/44* (2006.01)
*G06F 9/45* (2006.01)

(52) U.S. Cl.
USPC ............ 717/106; 717/104; 717/140; 717/144

(58) Field of Classification Search
None
See application file for complete search history.

(56) References Cited

U.S. PATENT DOCUMENTS

| | | | |
|---|---|---|---|
| 2003/0140028 A1* | 7/2003 | Sjogren et al. .................... 707/1 |
| 2004/0153991 A1* | 8/2004 | Chen et al. .................... 717/100 |
| 2004/0153992 A1* | 8/2004 | Molina-Moreno et al. ... 717/105 |
| 2005/0066338 A1* | 3/2005 | Bloesch et al. ............... 719/328 |

* cited by examiner

*Primary Examiner* — Insun Kang

(57) ABSTRACT

In one approach, a method is described of generating an interface for an operating system kernel. The method calls for creating an input file, where the input file includes a node structure for the interface. A kernel component of the interface is generated from the input file. A user space component of the interface is also generated from the input file.

12 Claims, 8 Drawing Sheets

-- Prior Art --

Flowchart 600

STATIC, CONFIGURABLE KERNEL INTERFACE

BACKGROUND

1. Field of the Invention

Embodiments of the present invention pertain to operating systems.

2. Related Art

The interface between the kernel of an operating system and applications running on top of the operating system is a crucial component of an efficient computing environment. Application programming interfaces (APIs) and application binary interfaces (ABIs) make the resources of the kernel available to other programs. A conflict exists, when designing these interfaces, between creating an efficient interface and a flexible interface.

Some interfaces for interacting with the kernels of modern operating systems are designed to be efficient but immutable. Except when the operating system is undergoing a major revision, no changes are made to these low-level interfaces, as any minor alteration could break existing applications which are relying on the interface to behave in a well-known manner. Other interfaces allow for a more flexible system, but at the cost of increasing the resources necessary to handle the interface; in order to allow more flexibility, the interface must itself be more complicated, which leads to a larger kernel.

SUMMARY

Detailed herein are approaches to providing a static, configurable kernel interface. In one approach, a method is described of generating an interface for an operating system kernel. The method calls for creating an input file, where the input file includes a node structure for the interface. A kernel component of the interface is generated from the input file. A user space component of the interface is also generated from the input file.

In another approach to the technology, a method of executing a user application is described. This method calls for referencing an interface element of an interface to an operating system kernel. The interface element is invoked, and an appropriate callback function is performed.

In another approach, a method is described for providing an interface to an operating system kernel. In this approach, a hierarchical tree model of the interface is generated, where the tree model includes a number of static nodes. Metadata associated with these static nodes is also generated. A kernel space component of the interface is compiled, including a flattened representation of the hierarchical tree model. A user space component for the interface is also compiled, including a traversable representation of a hierarchical tree model of the interface, as well as the metadata associated with the nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
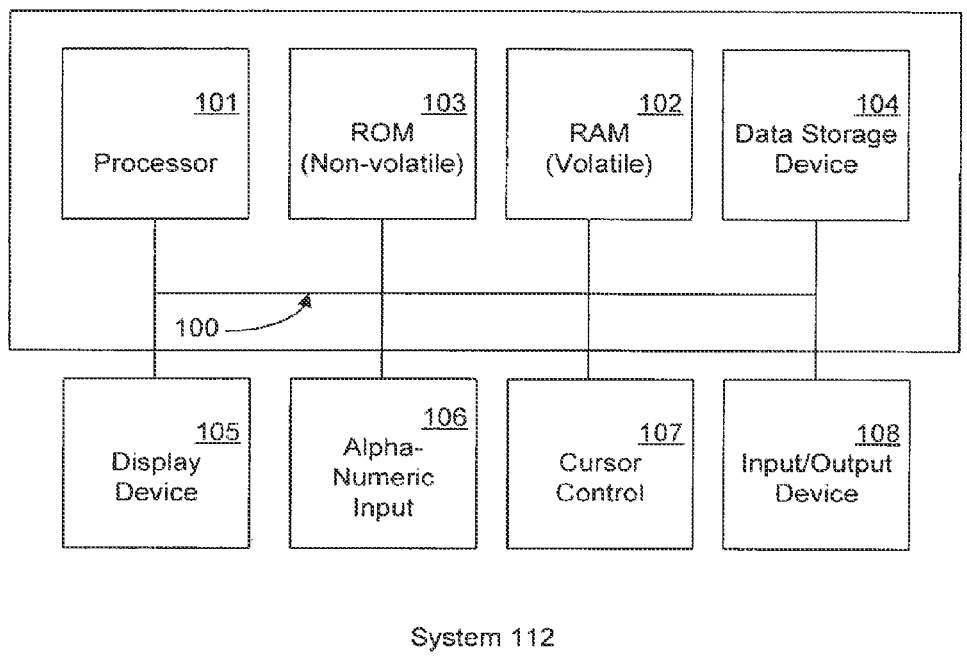
FIG. 1 is a block diagram of a computing system, upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Exemplary Computer System

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network.

Interfacing with an Operating System Kernel

Described herein are embodiments which provide an interface to an operating system kernel, as well as methods for organizing and generating such an interface. In some of these embodiments, a static organization is used to represent the various services and functions available through the interface. By using such a static organization, applications can be designed to take advantage of this rigid structure; these services and functions will almost always be located at the same place within the kernel. Moreover, in some embodiments, the organization and related metadata for each function and service need not be stored within the kernel itself; because the organization is fixed, this information can be maintained in a library file in user space, rather than within the kernel.

Moreover, embodiments are presented which allow for modification to the kernel structure. As is described in greater detail below, it is possible to identify changes to the kernel, the interface, and the functions and services. Once these changes are identified, this information can be used to identify issues in existing applications, which allow them to be quickly updated for use with the newest versions of the interface.

Additionally, embodiments allow for significant flexibility. By using dynamic instances of representative static structures, these embodiments allow interaction with even dynamic elements to use the same well-defined static organization. Further, in some embodiments, this concept of dynamic instances allows for straightforward extension of the interface itself. Additionally, embodiments provide substantial scalability benefits; the footprint of the static organization of the interface grows very slowly, relative to existing approaches, as the size of the system increases; it does not increase at all with the addition of dynamic instances.

Kernel Space and User Space

When designing an interface to a kernel, one consideration is how large of a footprint the interface should have. The larger the kernel, the greater the system resources necessary to handle the basic operation of the computer, and hence the less resources that are available for running user applications. Because the kernel is almost always active and loaded into memory, it is desirable that the kernel be no larger than it must. A related issue is one of scaling of the footprint; as more dynamic data is added to the interface, the footprint of the kernel grows larger. Such approaches do not scale well to relatively large or complex systems.

An additional consideration in interface design is the question of safe invocation of system calls. In traditional approaches to kernel interface design, a significant portion of the kernel is dedicated to error detection and handling. For example, a user application may invoke a system call and pass it data, in the form of an array-type object. Even if the system call is configured to accept an array as input, the kernel may have to perform error-checking on the format of data within the array.

Figure 2:
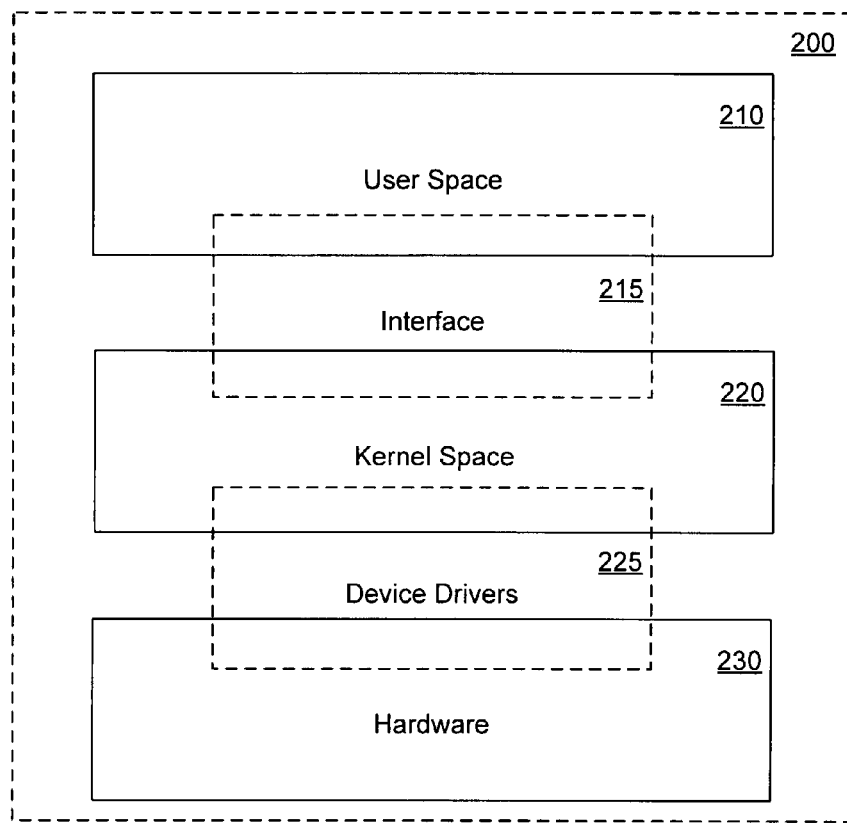
FIG. 2 is a representation of the programmatic layers of a computer system, in accordance with one embodiment of the present invention.

With reference now to FIG. 2, a representation of the programmatic layers of a computer system 200 are presented, in accordance with one embodiment. While FIG. 2 depicts certain, specific enumerated features and elements, it is understood that embodiments are well suited to applications with additional, fewer, or different features and elements.

As depicted in FIG. 2, computer system 200 can be envisioned as being made up of layers of increasing abstraction. The bottommost layer, shown here as hardware layer 230, consists of the actual electronic components that make up the computer system, e.g., a processor or system memory.

Moving one layer up from hardware layer 230, FIG. 2 shows kernel space 220. Interaction between kernel space 220 and hardware layer 230, in some embodiments, is achieved by the operation of one or more specific pieces of software, e.g., device drivers, shown here as device drivers 225. In some situations, a device driver may be specific to a particular manufacturer or even model of a hardware component. One of the functions of the kernel, and of the interface to the kernel, is to allow interaction between the highest abstraction levels with the hardware that makes up the computer system.

The uppermost layer, shown here as user space 210, interacts with kernel space 220 by means of an interface 215. Interface 215 exposes the functions and services available through the kernel to applications running in user space 210. An application executing in user space 210 can invoke "callback handlers" (or "handlers") in the kernel, to request services or to request that functions be performed on its behalf.

Static Tree Structure

In some embodiments, the organization of an interface to the kernel can be described by means of a branching tree structure. In several such embodiments, the location of individual nodes within the tree structure can be determined before the kernel is compiled, and fixed. By fixing the organization of the interface at compile time of the kernel, the uncertainty inherent to more dynamic systems can be mitigated.

Figure 3:
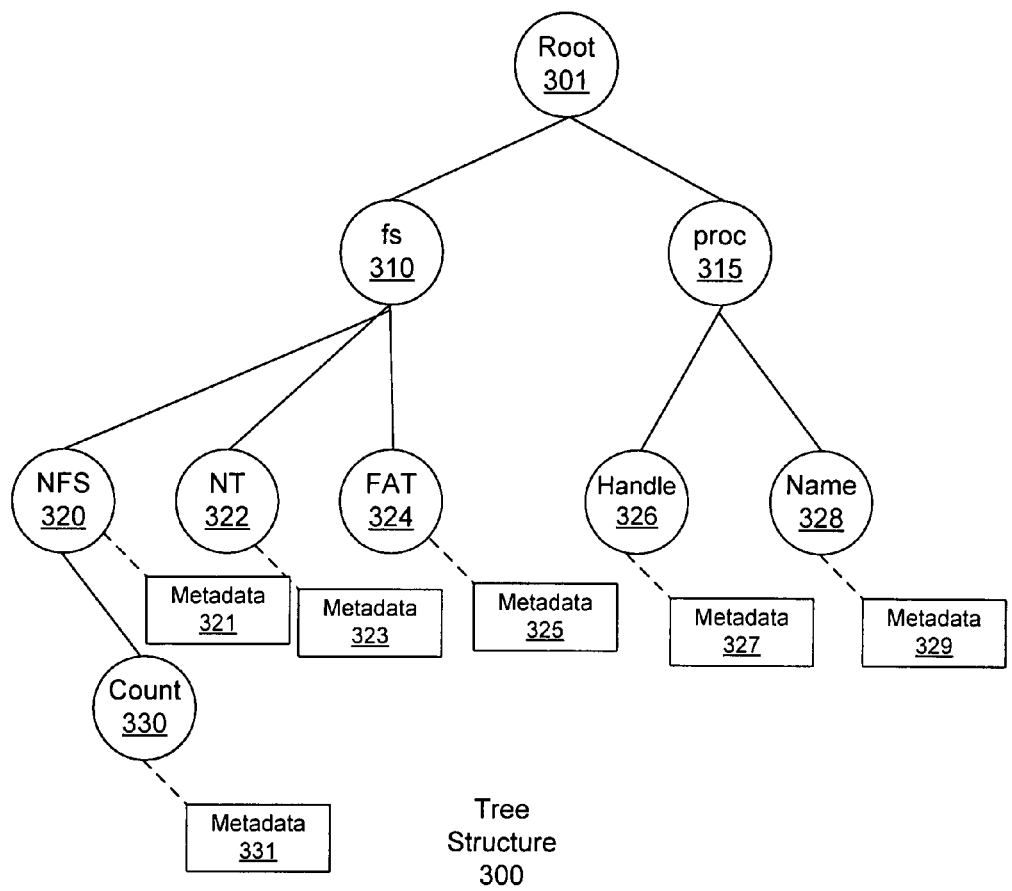
FIG. 3 is an interface tree structure, in accordance with one embodiment.

With reference now to FIG. 3, an interface tree structure 300 is depicted, in accordance with one embodiment. While FIG. 3 depicts certain, specific enumerated features and elements, it is understood that embodiments are well suited to applications with additional, fewer, or different features, elements, or organizations.

As shown in FIG. 3, tree structure 300 begins with root node 301. Tree structure 300 branches at root node 301, and splits to nodes file systems (fs) 310 and processes (proc) 315. Each of those nodes, in turn, branches off to additional nodes, until the terminal leaves of tree structure 300 are reached, e.g., count 330, or name 328.

In some embodiments, some or all of the nodes in the tree structure will have associated metadata, e.g., Metadata 321, 323, 325, 327, 329, and 331. The contents of this metadata may vary, both across embodiments and across different nodes. In some embodiments, this metadata could include the parameters for interacting with the node, such as the data type of data sent to or received from the node, and the format of that type; e.g., metadata 327, associated with Handle 326, may indicate "64 bit integer" as the expected data type for Handle 326, while metadata 329, associated with Name 328, indicates that Name 328 is a "null-terminated array of at most 128 ASCII characters." In some embodiments, metadata may also include the handlers, or information about the handlers, used for interacting with a particular node.

In some embodiments, the organization of a tree structure corresponding to the interface is established prior to compilation of the kernel. In one such embodiment, one or more input files can be used both to lay out the structure, and to define the metadata that accompanies each node. When these input files are compiled, in some embodiments, a flattened version of the tree structure remains as part of the kernel, while the metadata for each node, including its position within the original tree structure, is placed in a library in user space.

Moreover, in some embodiments, some or all of the nodes within the tree structure are assigned an identifier, e.g., a sequentially increasing number, by which the interface will recognize invocations of those nodes; the library would contain a mapping of the name of the node to the identifier. In such embodiments, the kernel need only contain those identifiers, rather than the string naming the node, which further reduces the size of the kernel. Because the organization of the tree is static after compilation, in some embodiments, there is no concern that a node will have moved from the position indicated by the position-based identifier.

When discussing a tree structure, it is convenient to utilize a top down naming convention, e.g., where node count 330 could be referred to as /fs/NFS/count, while node name 328 could be addressed as /proc/name.

In some embodiments, several basic operations are available for interacting with nodes. In some embodiments, the "get" operation is used to retrieve some information associated with the node. For example, performing a get on /fs/NFS/count may retrieve the numeric value indicating the number of NFS based filesystems currently mounted on the computer. In some embodiments, the "set" operation is used to assign some data to a node. For example, performing a set on /proc/name may allow the invoker to change or specify a string name to associate with that process. In some embodiments, the "list" operation is used to retrieve a listing of children of that particular node. In several such embodiments, list operations are limited to use with nodes with dynamic children; such embodiments are described in greater detail, below.

Dynamic Instances and Multiple Trees

In some embodiments, the interface is implemented in a manner that allows for dynamic instances, or dynamic children, of static nodes, or entire branches, to be utilized. For example, if the static tree description of the interface includes a branch for processes, these embodiments allow multiple different processes to be created, each of which will have the same parameters, properties, and functions as the static archetype, or template, they are based on.

Also, in some embodiments, the interface may be implemented in a manner that allows for extension of the interface through the use of dynamic instancing. For example, the interface may have a single static node for filesystems, fs. As defined by the interface, node fs may not have children or defined properties of its own. However, the interface allows for another interface tree to be referenced as a dynamic instance of the node fs. In such a situation, the parameters and properties of this child tree could reside in a separate library in user space.

Figure 4:
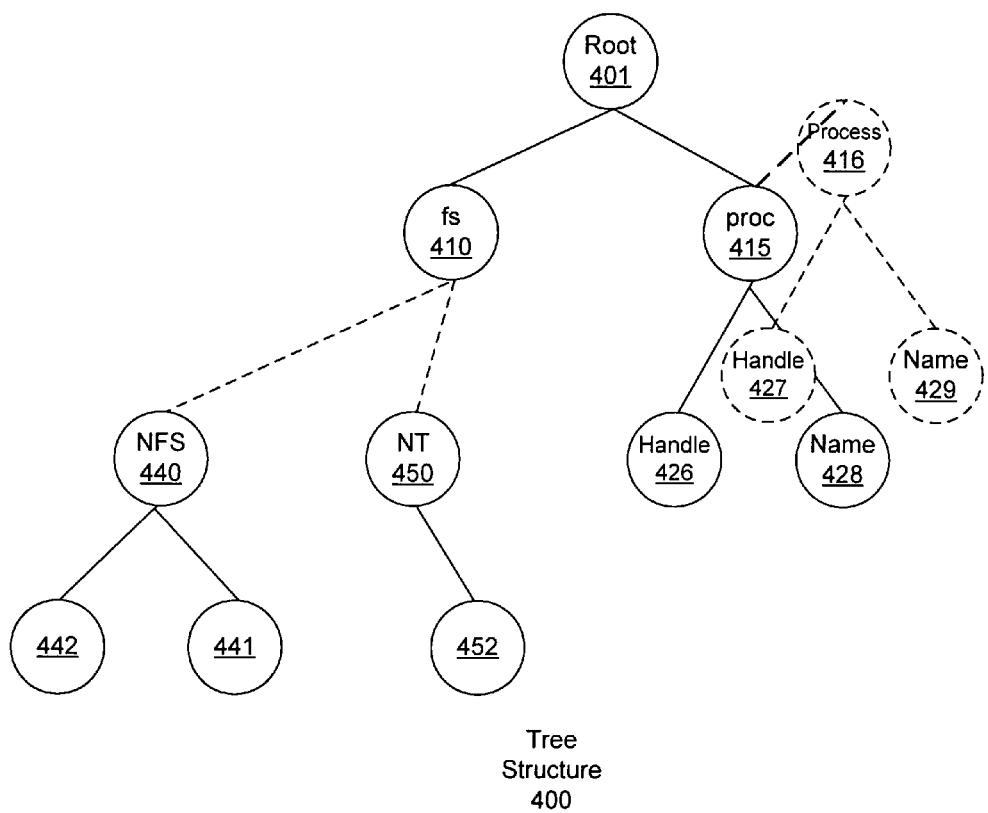
FIG. 4 is an interface tree structure with dynamic instances, in accordance with one embodiment.

With reference now to FIG. 4, a dynamic interface tree structure 400 is presented, in accordance with one embodiment. While FIG. 4 depicts certain, specific enumerated features and elements, it is understood that embodiments are well suited to applications with additional, fewer, or different features, elements, or organizations.

As depicted, dynamic interface tree structure 400 includes root node 401. Dynamic interface tree structure 400 branches to a file system node, fs 410, which has no defined children. The tree structure also branches to a processes node, proc 415, which has two defined children, handle 426, and name 428.

Dynamic interface tree structure 400 is shown with several dynamic instances of both the proc and fs nodes. With respect to the proc node, dynamic interface tree structure 400 is shown as including a single dynamic instance of type proc, namely process 416. Process 416 is shown as having two children, handle 427 and name 429. In the depicted embodiment, process 416 responds to the same parameters and function calls as the archetype node, proc 415. In some embodiments, in order to address specific dynamic instances, it is necessary to use some identifier associated with that dynamic instance. For example, in order to interact with process 416, handle 427, an assigned process identification number, could be used to identify which process is being accessed.

In some embodiments, it is possible to have nested dynamic instances. For example, the static tree structure may allow dynamic instances to be created for both a parent node and a child node, such that a single dynamic instance of the parent could allow multiple dynamic instances of the child. In that situation, it may be necessary to fully identify the target of an operation, e.g., by requiring calls to provide the dynamic identifier of both the parent and the child, such as the handles.

Dynamic interface tree structure 400 is also shown as including two dynamic instances of fs node 410. In some embodiments, fs node 410 is described as a module node, e.g., a node where modules or extensions to the interface can be connected. Module nodes, in these embodiments, allow for additional functionality not present in the core interface to be added in. This is useful in numerous settings. For example, in development work, using a module node allows experimentation and development of a portion of the interface, without altering the root structure. Additionally, variations on the kernel, such as the inclusion of certain features not present in other versions, would not require changing the root tree structure; instead, module nodes can be used to insert the additional functionality.

As shown, two different filesystem APIs have been added to dynamic interface tree structure 400 by means of the module node fs 410: NFS 440 and NTFS 450. Each of these two filesystem APIs, in some embodiments, is effectively a separate tree, with its own metadata and tree structure. Through the utilization of module nodes, some flexibility is allowed, particularly in situations where a single static description may not cover all the desired implementations. As shown, NFS 440 has two children, nodes 441 and 442, while NTFS 450 is shown with only a single child node, node 452. By allowing each file system to be described by its own tree, it is not necessary that all filesystem APIs conform to precisely the same static tree structure.

Compiling the Interface

Figure 5:
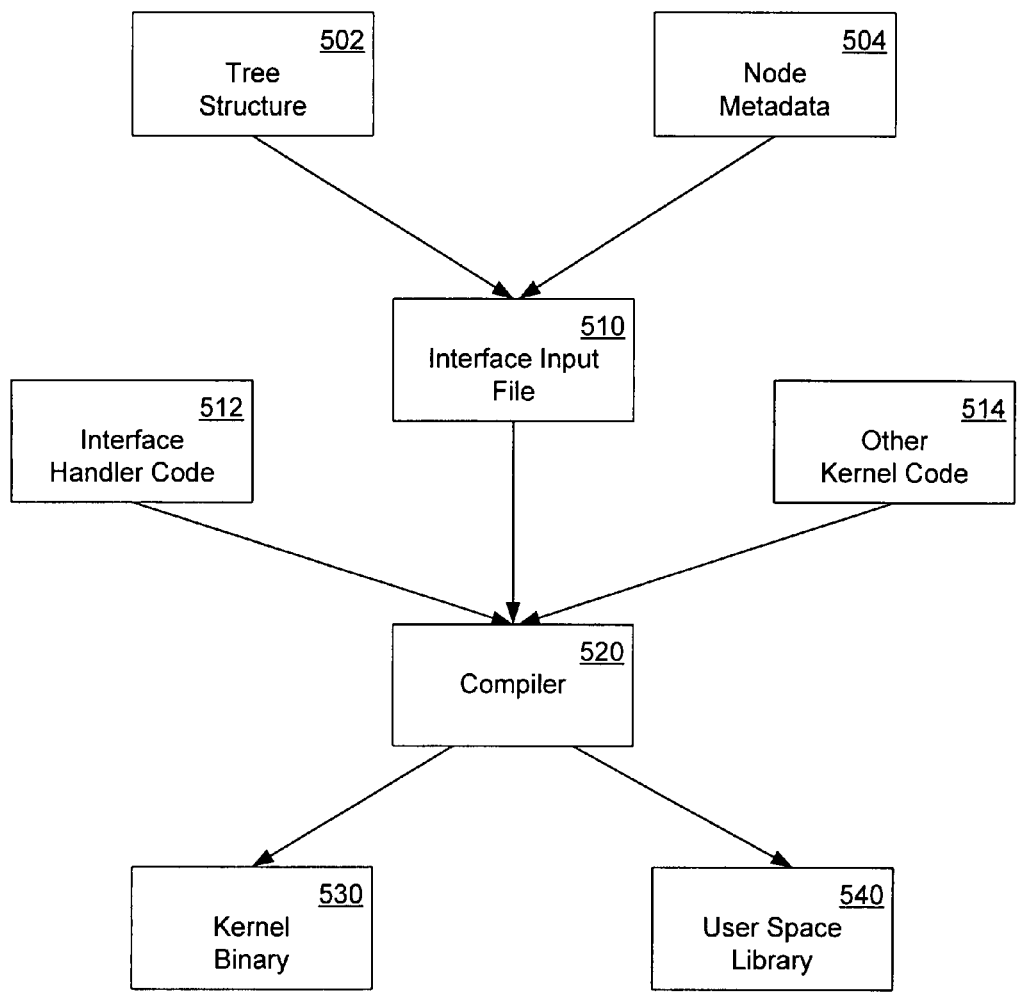
FIG. 5 is a diagram of the stages in the compilation of a kernel, in accordance with one embodiment.

With reference now to FIG. 5, a diagram of the stages in the compilation of a kernel is depicted, in accordance with one embodiment. While FIG. 5 depicts certain, specific enumerated features and elements, it is understood that embodiments are well suited to applications with additional, fewer, or different features, elements, or organizations.

FIG. 5 shows a description of a tree structure, tree structure 502, and a description of node metadata, metadata 504, combining to create an interface input file, input file 510. The formatting used for any or all of these descriptions will vary, across different embodiments. Moreover, the number of descriptions necessary to generate the input file will also vary; for example, if multiple separate tree structures are to be merged into a single root tree structure, multiple tree structure descriptions may be needed. In some embodiments, multiple input files are used, e.g., for describing different portions of the tree, or for separating code intended for kernel space from code intended for a user space library.

FIG. 5 shows that input file 510, as well as the code needed to implement the handlers used for the interface, interface handler code 512, and the remainder of the kernel code, other kernel code 514, are passed to a compiler, compiler 520. Compiler 520 produces a kernel binary 530, and one or more user space library files 540. In some embodiments, multiple compilers may be used to produce these separate outputs, e.g., a C++ compiler to produce kernel binary 530, and an XML parser to produce user space library files 540. Moreover, in some embodiments, input file 510 may first be used to generate source code, which is passed in turn to compiler 520 for compilation into binary form.

Figure 6:
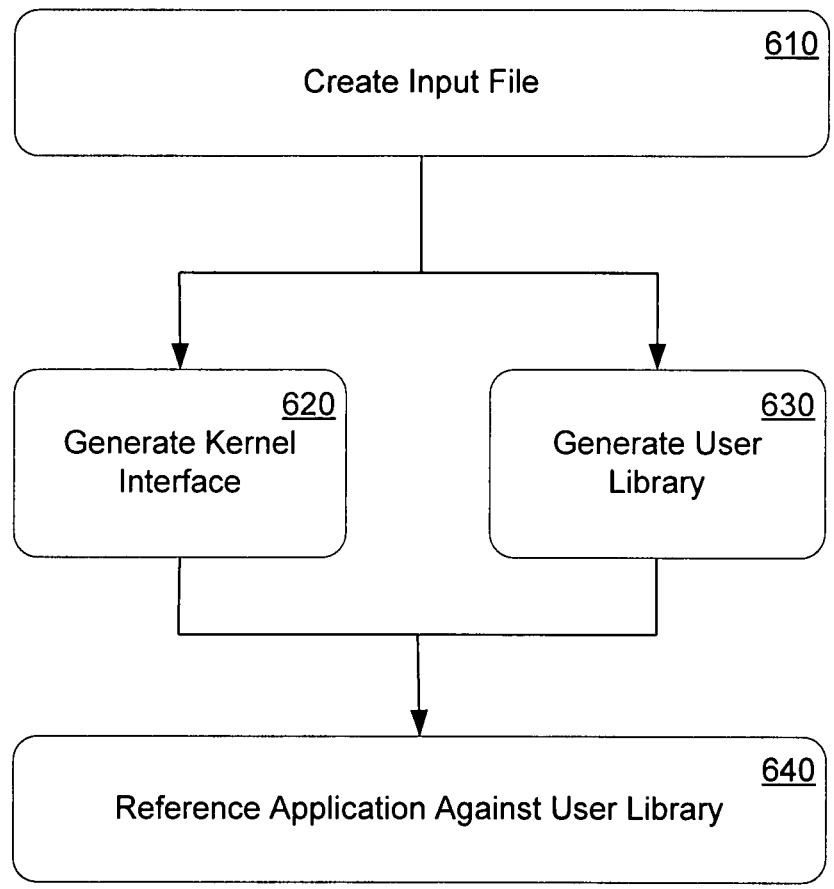
FIG. 6 is a flowchart of a method of compiling a kernel interface, in accordance with one embodiment.

With reference now to FIG. 6, a flowchart 600 of a method of compiling a kernel interface is depicted, in accordance with one embodiment. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference to step 610, an input file is created. In some embodiments, as is shown in FIG. 5, an input file may be the aggregation of a description of a tree structure for the interface and the metadata associated with the tree and/or the tree's nodes. In other embodiments, alternative means of generating an input file are utilized. Further, in some embodiments, multiple input files may be utilized.

With reference now to step 620, the kernel interface is generated. In some embodiments, as in FIG. 5, this step may involve passing the input file to a compiler, which generates binary or object code appropriate to the computing platform. In some embodiments, this step may entail combining some portion of the input file with other data, e.g., source code, object code, or binary code for other portions of the kernel or for handler routines associated with the interface. Further, in some embodiments, this step may involve calculating versioning information for the interface; this is detailed in greater depth, below.

With reference now to step 630, a user library for the interface is generated. In different embodiments, the number of discrete files required for the user library will vary. In some embodiments, as in FIG. 5, the user library may be generated by the same compiler used to generate the binary kernel interface. In other embodiments, one or more separate compilers may be used to generate one or more user library files. In some embodiments, the user library contains a traversable description of the hierarchy of the interface. In some embodiments, the user library contains metadata associated with the nodes of the kernel interface, e.g., the data types of parameters associated with a node, or the children of a particular node. Further, in some embodiments, this step may involve calculating versioning information for the interface; this is detailed in greater depth, below.

With reference now to step 640, a user application is referenced against the kernel interface. In some embodiments, the step entails comparing interface calls made by an application against the actual kernel interface. In one such embodiment, when an application is compiled, any interface calls coded into that application are checked against the user library, to identify incompatible calls, e.g., calls using a format associated with an older version of the interface. In another such embodiment, when an application is executed, inappropriate interface calls, e.g., calls with inappropriate syntax, will return an informative error message. In such embodiments, alterations to the kernel interface which affect user applications are quickly and easily identified, which allows the applications to be rapidly updated.

Versioning

In some embodiments, a versioning scheme is implemented, such that an alteration to an element of the kernel interface is readily detectable, e.g., at the time of compiling the kernel binary. In some embodiments, a version identifier can be used for some or all of the nodes in the interface hierarchy, where the version identifier will change if some element of that node changes.

In one such embodiment, hash values are calculated for each addressable node in the kernel interface. If an element of such a node changes between versions of the kernel interface, e.g., a data type for a parameter associated with the node changes from a 16-bit integer to a 32-bit integer, the calculated hash value will differ between those two versions of the kernel interface.

Versioning information can be utilized in a number of ways, in different embodiments. In one embodiment, versioning information can be used to identify changes to the kernel interface, and generate a list of changed interface elements. In another embodiment, versioning information can be included as part of the user space library files. In one such embodiment, the version identifier for a particular node is passed to the kernel interface by a user application referencing that node. If the version identifier matches with an internally maintained list of version identifiers available to the kernel, then the interface call is accepted. If the version identifier does not match with the internally maintained list of version identifiers, then the kernel can reject the request; if the version identifier does not match, the kernel interface and the interface user library are of different versions, and the call constructed using that interface user library may not be valid for this kernel interface.

User Applications

In some embodiments, compilation and execution of a user application will be influenced by the kernel interface. In several such embodiments, interaction between the user application in the kernel interface is dependent upon properly constructed calls to nodes of the interface. Accordingly, some embodiments implement one of several available forms of error or syntax checking.

Figure 7:
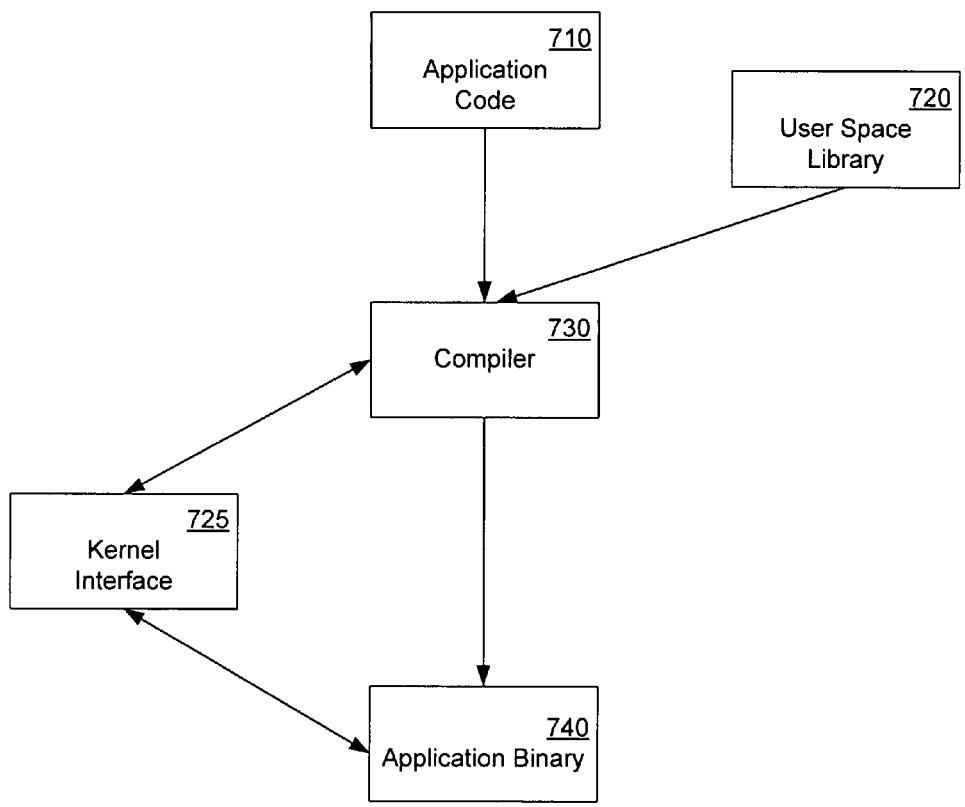
FIG. 7 is a diagram of the stages in the compilation of a user application, in accordance with one embodiment.

One such embodiment is depicted in FIG. 7, a diagram of the stages in the compilation of a user application. Application code 710 includes a call to an interface function. When application code 710 is passed to compiler 730, user space library 720 is used to verify that such a call is properly configured. Moreover, in some embodiments, compiler 730 may access kernel interface 725 to further verify the interface call, e.g., through the use of versioning associated with kernel invocations. In some embodiments, compiler 730 may compare a version identifier, associated with user space library 720, with a version identifier available through kernel interface 725, in order to ensure that user library 720 and kernel interface 725 are for the same version. Compiler 730 produces application binary 740. When application binary 740 is executed, it will attempt to execute the call to the interface function. Kernel interface 725 will attempt to verify the interface call, e.g., through the use of versioning.

The embodiment depicted in FIG. 7 allows for several redundant checking operations to be performed. When an application is first compiled, the calls made by that application will be verified against the current version of the kernel interface. If, at some later time, the kernel interface has changed, the compiled application binary may no longer be valid. By checking interface calls when the application is to be executed as well, previously compiled applications which are no longer compatible with the interface can be identified, and the incompatibility specifically identified.

In some embodiments, compile-time error checking for user applications includes checking for usage errors. In those embodiments, when an application incorporates direct references to the kernel interface, e.g., the user application may have been coded with knowledge of the interface hierarchy for the kernel interface it would be used with, errors resulting from name changes and data type changes can be detected.

In some embodiments, run-time error detection for user applications includes checking for bounds errors and/or content errors. In several such embodiments, where direct invocation of interface elements is utilized by the user application, it can be determined which nodes might be accessed by the user application; e.g, by determining whether the user application includes a direct reference to a particular node. Given this information, those invocations can be checked against the current interface. In some embodiments, this check can be performed at load-time for the user application. In some embodiments, usage errors are also detected.

Several advantages are realized through embodiments which incorporate such error detection. First, applications compiled under older versions of the interface but which only use interface elements unaffected by any changes may still execute. By performing error checking on a node-by-node basis, rather than a single interface-wide version identifier, functioning applications do not require recompiling unless one of the nodes they interface with is altered. Second, every node referenced by the user application can be checked, even if that use is unlikely. By checking every interface element the application might use, errors can be detected earlier, e.g., at load time, rather than in mid-execution.

The kernel interface, in addition to providing error detection, also allows user applications to interface with the kernel in a number of ways.

Figure 8:
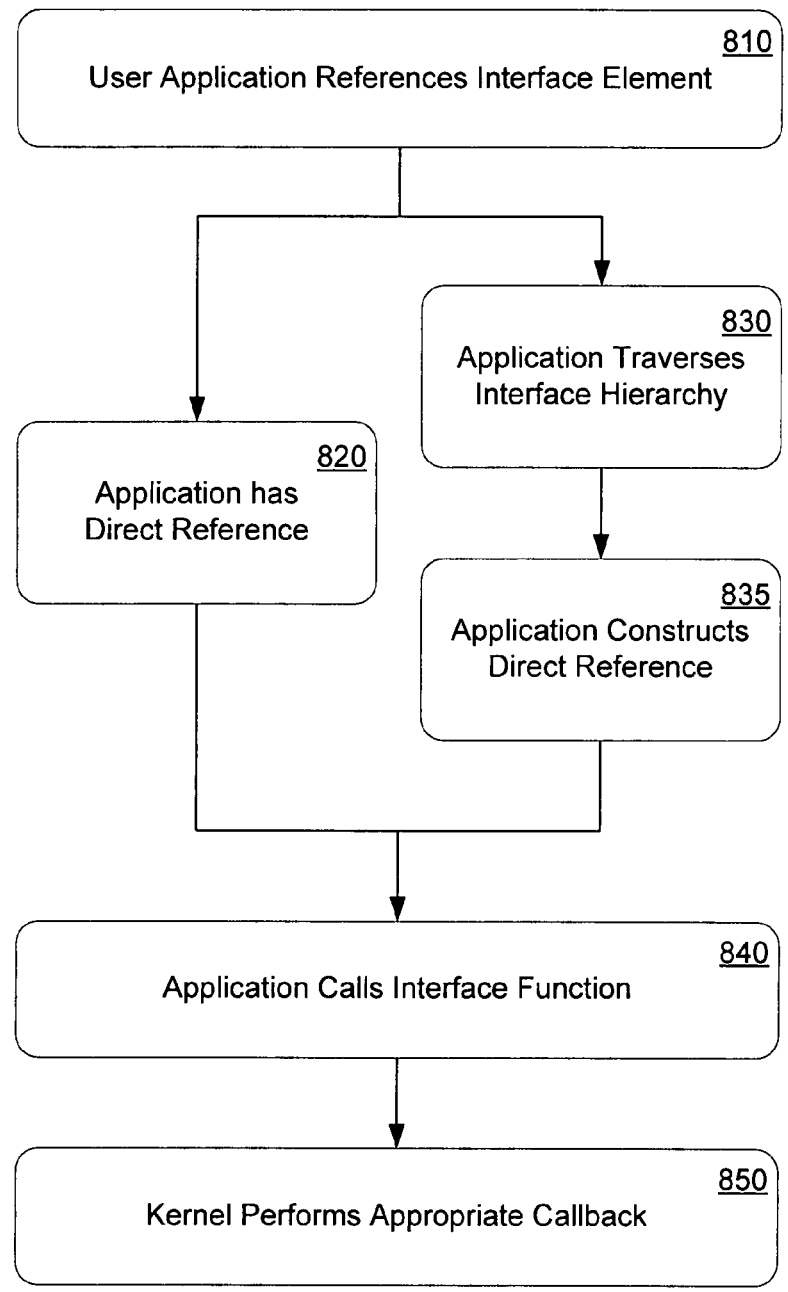
FIG. 8 is a flowchart of a method of executing a user application, in accordance with one embodiment.

With reference to FIG. 8, a flowchart 800 of a method of executing a user application is depicted, in accordance with one embodiment. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

With reference to step 810, a user application attempts to reference an interface element. In different embodiments, such a reference could take a variety of forms.

With reference to step 820, the user application has a direct reference to the desired interface element available. In some embodiments, the user application may have been coded with knowledge of the interface hierarchy for the kernel interface it would be used with. For example, with reference to FIG. 3, the user application may know how to reference /fs/nfs/count directly.

With reference to step 830, the user application traverses the hierarchy of the kernel interface to identify the appropriate interface element. In some embodiments, the user application may not have been written for a specific version of a kernel interface, but may have been designed to traverse the user library associated with the kernel interface at execution time, in order to identify the desired node. For example, with reference to FIG. 3, the user application may examine root node 301 to identify its children, then examine fs node 310 for its children, and so on until it identifies the desired node.

In some embodiments, the user application may be coded for a portion of the interface hierarchy, e.g., the interface may be coded for a portion of the hierarchy known to be relatively immutable, while identifying any particular leaf further down the tree is left for execution time.

With reference to step 835, the user application constructs an appropriate interface call. In some embodiments, after the user interface has traversed the interface tree to identify a specific node, it accesses the metadata stored in the user library for that node, in order to construct a syntax-appropriate call to that node.

With reference to step 840, the application calls a supported interface function for the desired node. In some embodiments, interface functions are limited to get, set, or list operations, as described above. In several such embodiments, list operations are limited to dynamic instances of nodes; in some of these embodiments, error checking for the interface will identify attempts to use the list operation on static nodes.

With reference to step 850, the kernel responds to an appropriate interface call by performing an associated callback function.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of generating an interface for an operating system kernel, comprising:
    creating an input file at a computer system, said input file comprising a hierarchical tree structure comprising a plurality of nodes and metadata associated with said plurality of nodes for said interface;
    generating a kernel component of said interface from said input file at said computer system, said kernel component comprising a flattened representation of said hierarchical tree structure; and
    generating a user space component of said interface from said input file at said computer system, said user space component comprising a traversable representation of said hierarchical tree structure, and said user space component comprising said metadata associated with said plurality of nodes of said hierarchical tree structure.

2. The computer-implemented method of claim 1, wherein said user space component comprises a library file, said library file comprising said traversable representation of said hierarchical tree structure.

3. The computer-implemented method of claim 2, wherein said library file further comprises said metadata associated with said plurality of nodes of said hierarchical tree structure.

4. The computer-implemented method of claim 1, wherein said generating said kernel component comprises compiling a portion of said input file into a binary form.

5. The computer-implemented method of claim 2, wherein said generating said user space component comprises compiling a portion of said input file into said library file.

6. The computer-implemented method of claim 1, further comprising:
    compiling a user space application, said user space application utilizing said interface, with reference to said user space component.

7. The computer-implemented method of claim 1, further comprising:
    checking a user space application utilizing said interface for an error with reference to said user space component, upon execution of said user space application.

8. A method of providing an interface to an operating system kernel, comprising:
    generating a hierarchical tree model of said interface, said hierarchical tree model of said interface comprising a plurality of static nodes;
    collecting metadata associated with said plurality of static nodes;
    compiling a kernel space component of said interface, said kernel space component of said interface comprising a flattened representation of said hierarchical tree model of said interface; and
    compiling a user space component of said interface, said user space component of said interface comprising a traversable representation of said hierarchical tree model of said interface, said user space component of said interface further comprising said metadata.

9. The method of claim 8, further comprising:
    listing a dynamic instance of one of said plurality of static nodes.

10. The method of claim 9, wherein said dynamic instance conforms to said hierarchical tree model of said interface.

11. The method of claim 8, further comprising:
    generating a hierarchical tree model of an interface module associated with said interface;
    collecting metadata associated with said interface module;
    compiling a kernel space component of said interface module;
    compiling a user space component of said interface module; and
    associating said interface module with said interface.

12. The method of claim 8, wherein said collecting metadata comprises:
    gathering developer metadata associated with each of said plurality of nodes; and
    generating derived metadata associated with each of said plurality of nodes.

* * * * *